US008376678B2

(12) United States Patent
Walker

(10) Patent No.: US 8,376,678 B2
(45) Date of Patent: *Feb. 19, 2013

(54) EXTRACTION TOOL

(76) Inventor: William Arliss Walker, Butler, OH (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/705,590

(22) Filed: Feb. 13, 2010

(65) Prior Publication Data

US 2010/0156123 A1 Jun. 24, 2010

Related U.S. Application Data

(63) Continuation of application No. 11/734,215, filed on Apr. 11, 2007, now Pat. No. 7,686,359, which is a continuation-in-part of application No. 11/395,659, filed on Apr. 3, 2006, now abandoned.

(60) Provisional application No. 61/187,722, filed on Jun. 17, 2009.

(51) Int. Cl.
*F16B 25/10* (2006.01)
*B66C 1/00* (2006.01)

(52) U.S. Cl. .................................... 411/387.1; 408/199

(58) Field of Classification Search .................... 411/29, 411/387.1–387.7, 400, 401, 383; 408/199
See application file for complete search history.

(56) References Cited

U.S. PATENT DOCUMENTS

| | | | | |
|---|---|---|---|---|
| 4,016,944 | A * | 4/1977 | Wohlfeld | 175/92 |
| 4,900,207 | A * | 2/1990 | McGovern | 411/383 |
| 4,900,208 | A * | 2/1990 | Kaiser et al. | 411/387.1 |
| 4,958,796 | A * | 9/1990 | Bernosky | 248/317 |
| 4,996,806 | A * | 3/1991 | Platz | 52/157 |
| 5,145,286 | A * | 9/1992 | Summers | 405/259.1 |
| 5,743,678 | A * | 4/1998 | Pitre | 405/259.1 |
| 5,749,689 | A * | 5/1998 | Konig | 411/387.4 |
| 6,471,445 | B2 * | 10/2002 | Stansfield | 405/232 |
| 7,036,595 | B2 * | 5/2006 | Hailey | 166/301 |

* cited by examiner

*Primary Examiner* — Flemming Saether
(74) *Attorney, Agent, or Firm* — Ronald J. Koch

(57) ABSTRACT

An extraction tool having an elongated base member having first and second ends, and a drill bit being removably attachable to a socket in the first end; the base member having a first threaded portion being disposed approximate the first end; the second end being adapted to be removably connected to a load bearing coupling.

4 Claims, 4 Drawing Sheets

EXTRACTION TOOL

The present application is related to:

co-pending patent application Ser. No. 11/734,215, filed on Apr. 11, 2007, of William A. Walker, Butler, Ohio; and Patent Application Ser. No. 61/187,722, filed on Jun. 17, 2009, of William A. Walker, Butler, Ohio; and patent application Ser. No. 11/395,659, now abandoned, filed on Apr. 3, 2006, of William A. Walker, Butler, Ohio;

the disclosures of which are hereby incorporated by reference herein in their entirety as if fully rewritten herein.

BACKGROUND AND SUMMARY

Since the first inception of power and telephone poles very little innovation or new technologies have been introduced to remove these units once decayed or broken off due to hurricanes, accidents and/or other forces.

Lineman (utility workers for power companies, etc.) have struggled to remove power poles. Many times, having to excavate around these poles in order to use a choker chain or a massive hydraulic pole jack. While these devises do have their functions they also have their shortcomings, slipping off or just pushing the pole to the side. This can be very dangerous, time consuming and expensive.

The present invention has been designed for, but not limited to, the removal of power poles broken off at or near ground level due to auto accidents, flooding, storms and/or deterioration.

The present invention adapts to a Kelly bar on line trucks (known in the art) thus enabling the lineman to drill into a pole, post, stump, etc, thereby anchoring the tool head into whatever item is to be removed. The lineman can then attach the pull ring to the tool and securely winch the pole (which can be 18 to 36 inches in diameter) out of the ground. Some of the larger poles may require a relief hole excavated next to it to relieve pressure and/or suction. The present invention is advantageous because one man can now perform a task once requiring multiple persons. This results in saving the company time and money while providing safety for the lineman.

To remove the present invention from the rigid body, a spanner bar is inserted through the pull ring to unscrew, usually one to two turns counter clockwise and the tool will back out by hand.

The essence of the present invention is the use of aggressive screw threads on a very tough steel shaft and having the ability to use interchangeable drill heads for penetration of objects being removed. The invention can then connected to the hydraulic drive by use of a Kelly Bar adapter powering and/or drilling into items of removal.

The tip of the tool has a conical relief (transition from base into drill bit) to help prevent binding, burning and making for easier removal. The invention is then disconnected from the hydraulic drive and the pull ring (extraction coupling) is attached to the tool. A hydraulic winch is connected to the pull ring and the object is then pulled out or removed from the ground or water. The removal of this tool from an object is accomplished by turning the tool counter clockwise or until it is completely unscrewed.

REFERENCE NUMERALS IN DRAWINGS

Figure 1:
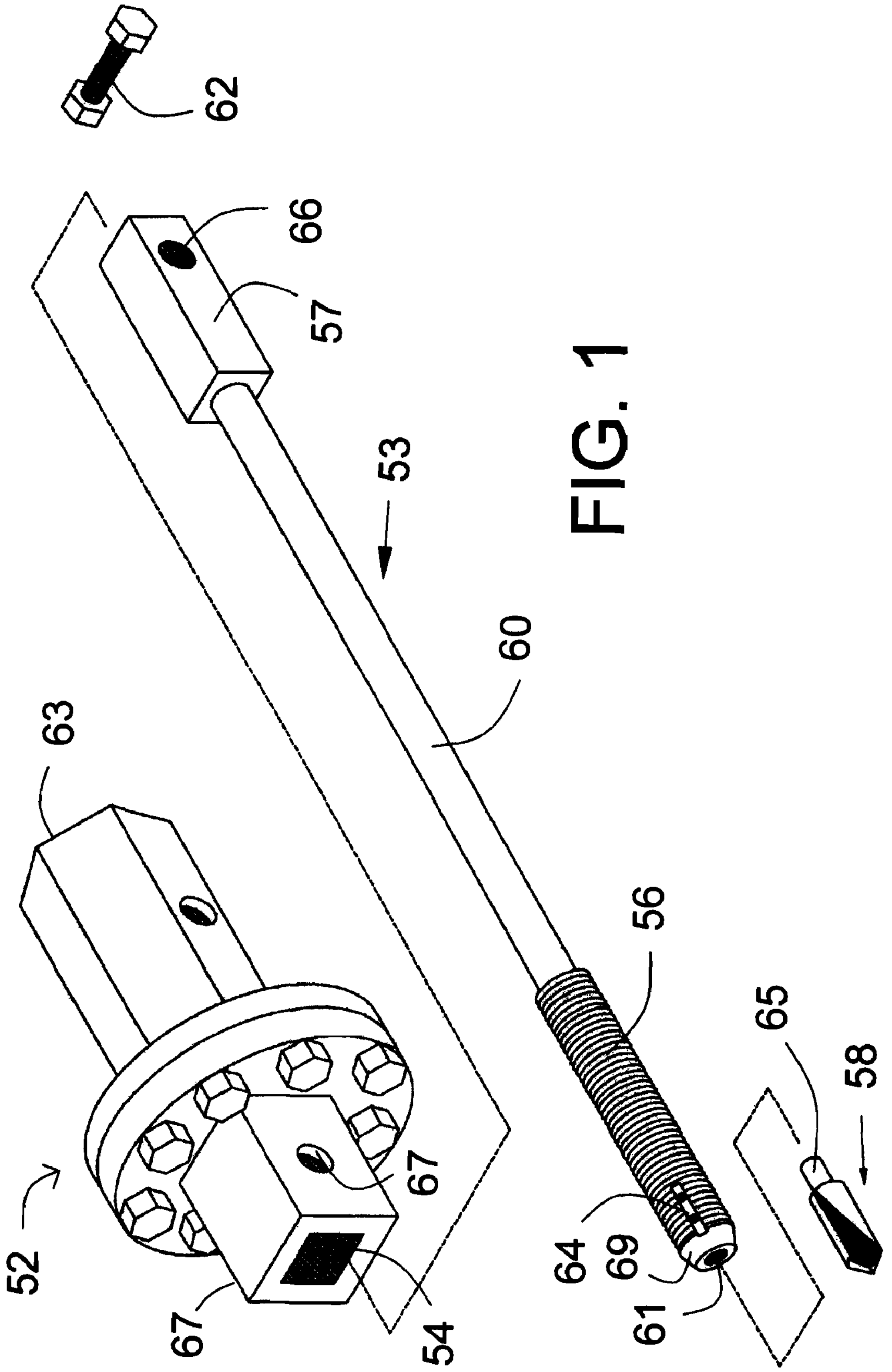
FIG. 1 depicts a perspective, exploded view of base member 53 and kelly bar assembly 52

The table below lists the reference numerals employed in the figures, and identifies the element designated by each numeral.

53 base member 53
54 drive tool adapter 54
55 extraction tool adapter 55
56 threaded portion 56
57 squared head portion 57
58 drill bit 58
59 handle 59
60 middle portion 60 of base member
61 drill bit socket 61
62 adapter fastener 62
63 Kelly Bar Adapter 63
64 drill bit fasteners 64
65 drill bit coupling stem 65
66 adapter socket 66
67 drive tool fastener holes 67
68 extraction tool fastener holes 68
69 conical transition bit mounting foot 69
70 extraction coupling 70
74 upper end 74 of extraction coupling

DETAILED DESCRIPTION

Figure 2:
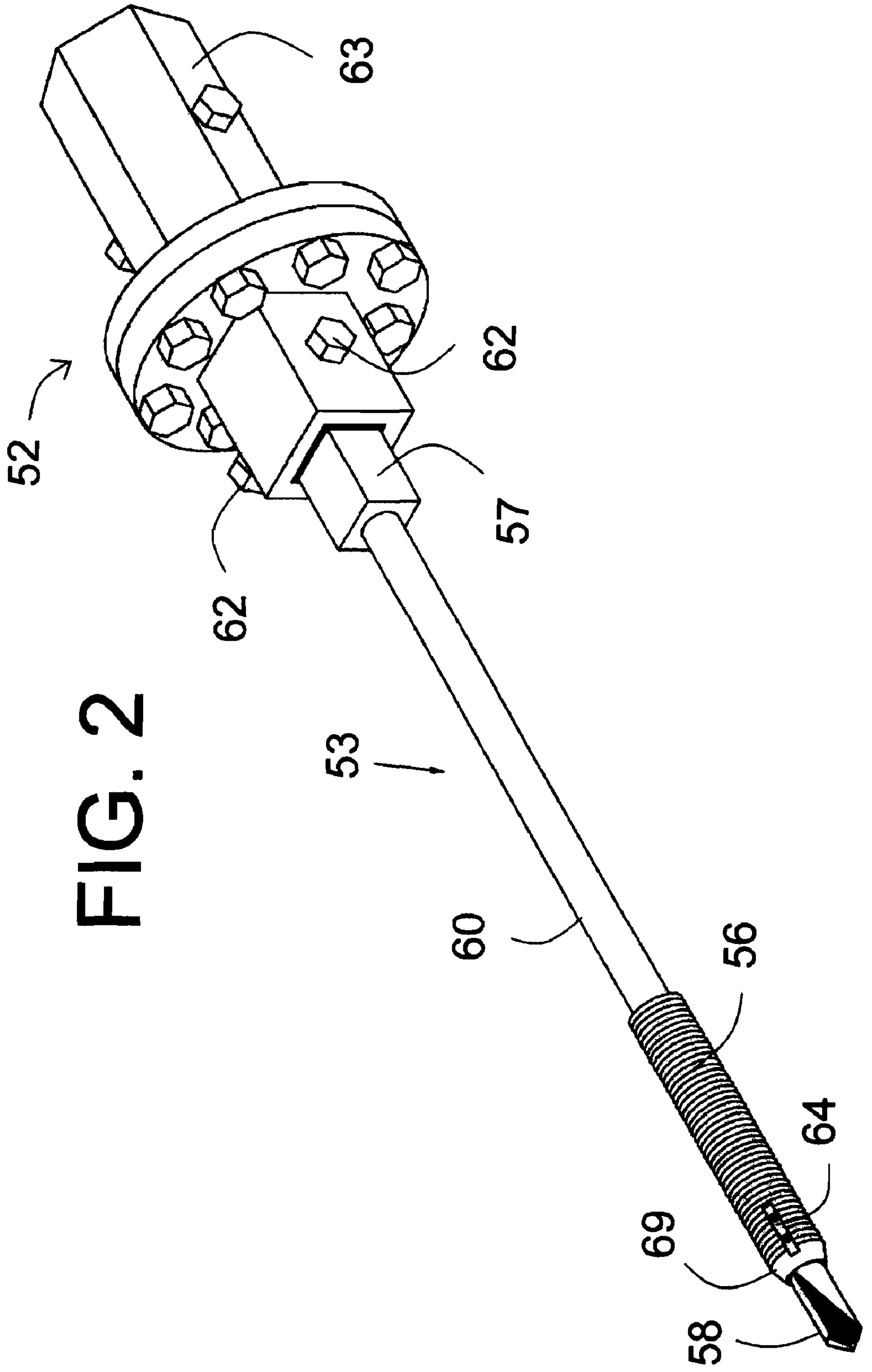
FIG. 2 depicts a perspective view of base member 53 and kelly bar assembly 52
Figure 3:
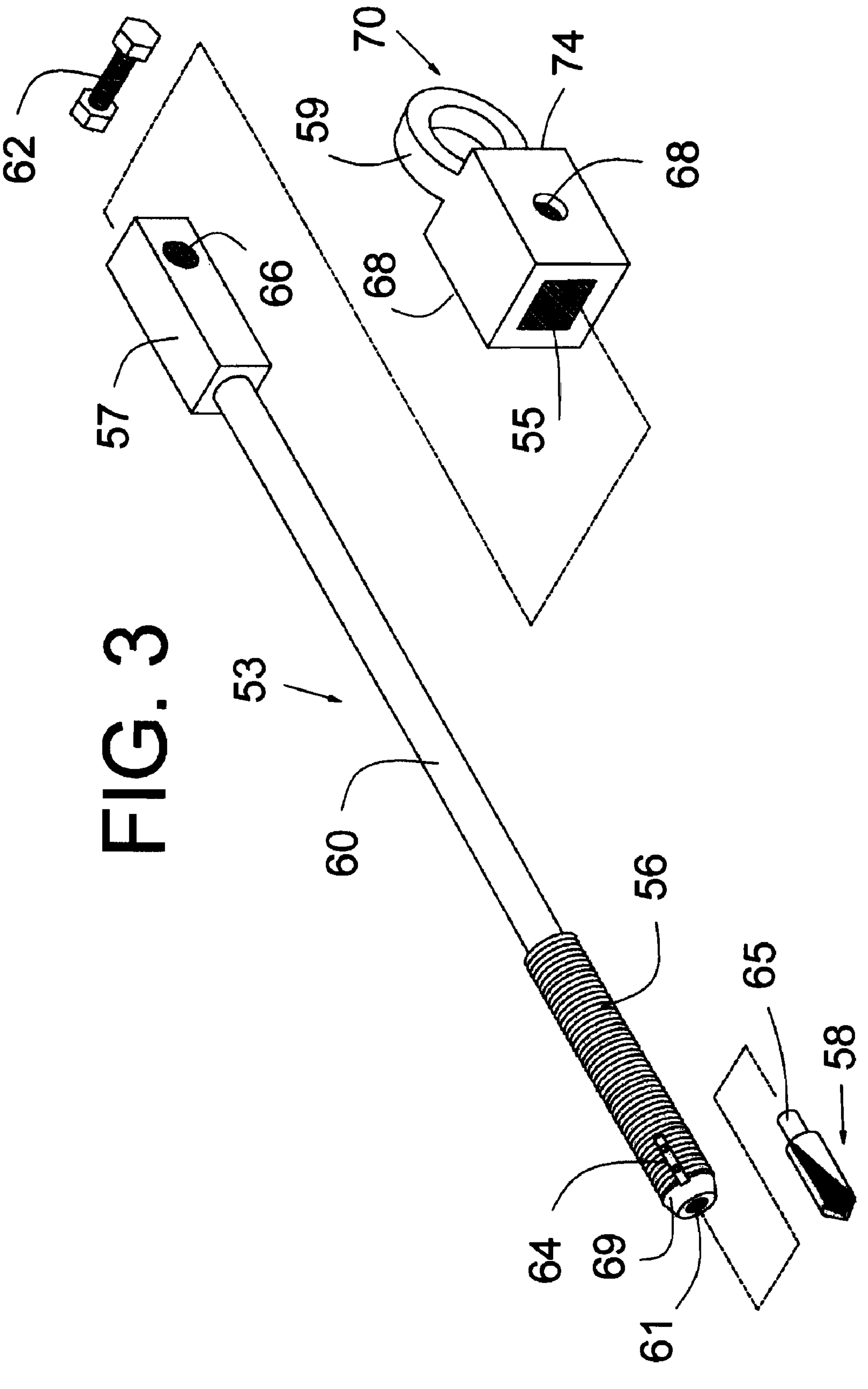
FIG. 3 depicts a perspective, exploded view of base member 53 and extraction coupling 70
Figure 4:
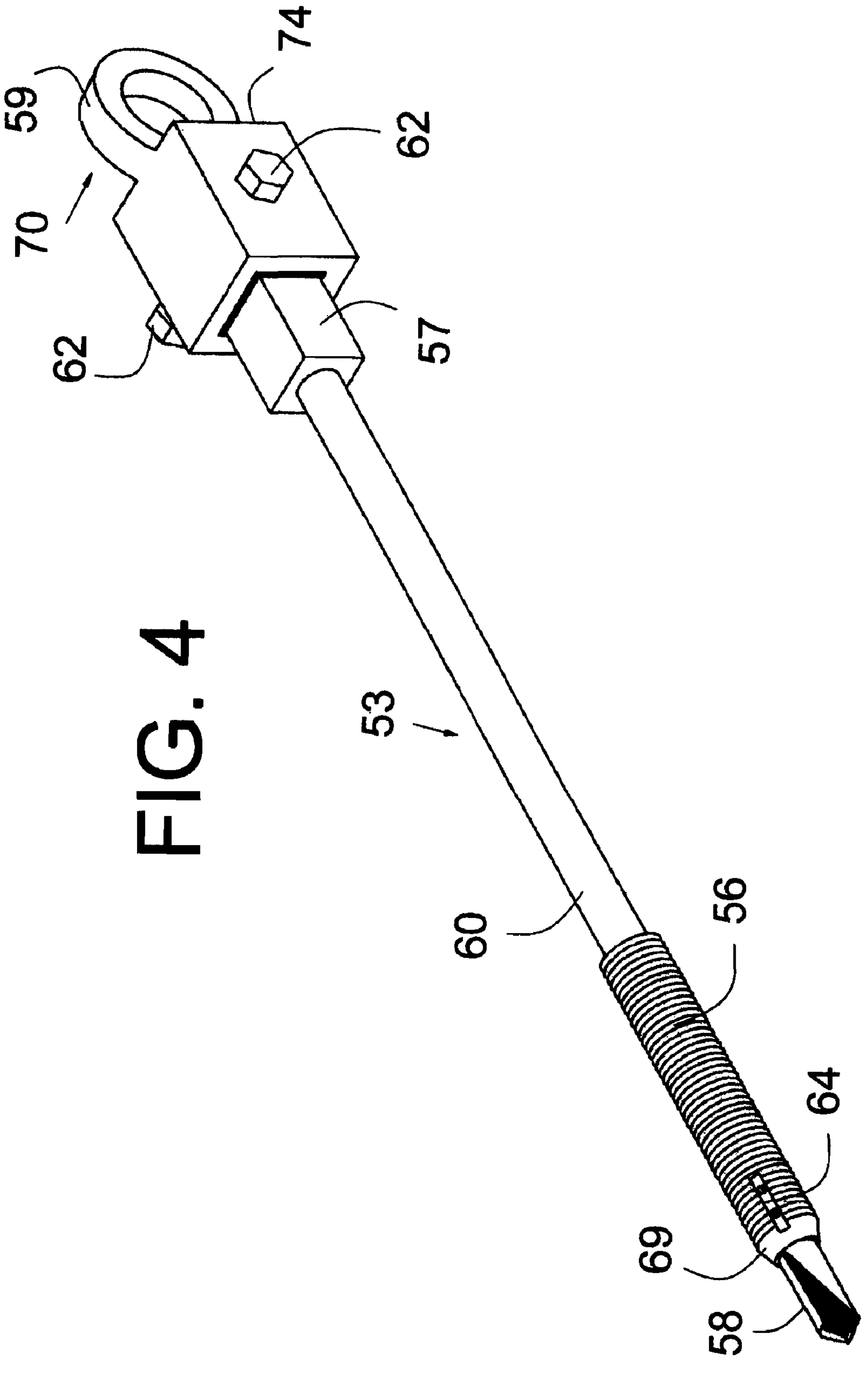
FIG. 4 depicts a perspective view of base member 53 and extraction coupling 70

As shown in FIGS. 1 through 4, a preferred embodiment of the present invention comprises base member 53, kelly bar assembly 52, and extraction coupling 70.

Base member 53 comprises squared head portion 57, adapter socket 66, cylindrical middle portion 60, threaded portion 56, conical transition bit mounting foot 69, drill bit socket 61, drill bit 58, and a plurality of drill bit fasteners 64. Kelly bar assembly 52 comprises drive tool adapter 54, drive tool fastener holes 67, and Kelly Bar Adapter 63. Extraction coupling 70 comprises extraction tool adapter 55, and handle 59. Extraction tool fastener holes 68 are displaced on opposite sides of extraction coupling 70. Extraction coupling 70 has an upper end 74. Base member 53 works in conjunction with either kelly bar assembly 52 or extraction coupling 70. Kelly Bar Adapter 63, is attached by bolted flange to drive tool adapter 54, which has two drive tool fastener holes 67.

Base member 53 is preferably formed of solid steel stock for optimum rigidity and torque resistance, and is preferably 36.0 inches in length. However, other lengths may be used; as will be appreciated by those of skill in the art, the spirit of the invention comprises removal of rigid bodies from the ground; therefore, the overall length of base member 53 may be varied accordingly.

Squared head portion 57 preferably has a cross section of 1.6 inches by 1.6 inches outside dimension and is preferably 5.0 inches in length. Squared head portion 57 has an adapter socket 66 (preferably 0.80 inches in diameter), located to enable releasable attachment to either drive tool adapter 54 or extraction tool adapter 55 by adapter fastener 62.

Squared head portion 57 transitions to a middle portion 60 which is preferably 2.0 inches in diameter. Middle portion 60 transitions to a threaded portion 56, that is preferably a 2½"-4 UNC male-threaded rod and 12.0 inches in length. As will be apparent, various thread sizes may be used. It is preferred that the thread used is aggressive, so as to facilitate drilling through wood, etc. The length and thread design of threaded portion 56 is sufficient to adequately engage a rigid body for extraction without splitting the body or stripping the extraction hole.

Threaded portion 56 transitions to conical transition bit mounting foot 69 and is preferably tapered from 2.0 inches in diameter to 1.38 inches in diameter. Conical transition bit mounting foot 69 is designed to help prevent binding, and burning, and it makes for easier removal of drill bit 58.

Bit mounting foot 69 has a centrally located drill bit socket 61 and a plurality of drill bit fasteners 64. The preferred embodiment depicted comprises 2 drill bit fasteners. However, other quantities may be used provided the spirit of the invention is not compromised.

Drill bit socket 61 is preferably 0.875 inches in diameter and 2.5 inches in length, and fabricated to accommodate the mounting of drill bit coupling stem 65 of drill bit 58.

Drill bit 58 is preferably made of steel and 1.5 inches in diameter and 4.5 inches in length. Drill bit 58 has a drill bit coupling stem 65 that is preferably cylindrical (so as to allow it to fit within drill bit socket 61), and 0.75 inches in diameter and 2.25 inches in length.

Drill bit fasteners 64 are preferably stainless steel Allen screw sets of a predetermined size sufficient to secure drill bit coupling stem 65.

Preexisting Kelly Bar Adapter 63, is attached by bolted flange to a preexisting drive tool adapter 54, which has two drive tool fastener holes 67. Drive tool adapter 54 is capable of releasable attachment to squared head portion 57 of base member 53. Drive tool fastener holes 67, located one on each of parallel opposite sides, are to be aligned with adapter socket 66, and are preferably 0.80 inches in diameter. Drive tool adapter 54 has an inner recessed portion of rectangular cross section having dimensions of approximately 1.725 inches by 1.725 inches whereby squared head portion 57 is capable of fitting within.

Extraction coupling 70 is made capable of releasable attachment to squared head portion 57 of base member 53, and comprises extraction tool adapter 55, handle 59, and extraction tool fastener holes 68. Extraction coupling 70 is preferably made of steel and 8.0 inches in length.

Extraction tool adapter 55 is of sufficient thickness to provide sufficient rigidity and strength as required for the extraction of rigid bodies. It is preferably 4.0 inches in length, and has an outer cross section of 2.13 inches by 2.13 inches. Extraction tool adapter 55 has an inner recessed portion of rectangular cross section having dimensions of 1.725 inches by 1.725 inches whereby squared head portion 57 is capable of fitting within.

Extraction tool fastener holes 68, located one on each of parallel opposite sides, are to be aligned with adapter socket 66, and are preferably 0.80 inches in diameter.

Handle 59 is preferably welded onto upper end 74 of extraction coupling 70, and 4.0 inches outer diameter and 0.50 inches thick. Handle 59 is made to provide sufficient rigidity and strength as required for extraction of the rigid body. The shape is such to allow for the hook shaped member of a winch system to be attached to handle 59 for extraction of the rigid body. The shape is also such to allow a worker to manually turn the handle to unscrew and disengage base member 53 (in combination with extraction coupling 70) from the rigid body.

The primary purpose of drive tool adapter 54 and extraction tool adapter 55 is to accommodate squared head portion 57. Therefore, as will be apparent, the shapes thereof may be deviated from provided said primary purpose is not compromised.

Threaded adapter fastener 62 is preferably a common ⅝ inches diameter steel bolt with nut and lock washer, or a common ⅝ inches diameter steel belt-arm retaining pin with coil lock. Threaded adapter fastener 62 is preferably 0.7375 inches outer diameter and capable of fitting within adapter socket 66, and within either drive tool fastener holes 67 or extraction tool fastener holes 68.

It is preferred that conical transition bit mounting foot 69, threaded portion 56, middle portion 60 of base member 53, and squared head portion 57 be made from one piece of metal. This can be accomplished utilizing various known machining techniques. The invention as a whole is stronger in terms of its ability to withstand various forces, stresses, and tensions when made in this manner. However, other techniques may be used. The various parts of the invention can originate as separate pieces being joined together. Various means of joining, such as welding, can be used provided the invention maintains sufficient strength.

The preferred embodiment depicted comprises squared head portion 57 having larger cross-sectional dimensions than the diameter of middle portion 60 of base member 53. This is not essential. In fact, if the invention is machined out of one piece of metal, squared head portion 57 will have smaller cross-sectional dimensions. This is acceptable and also preferred. The foregoing designs may be used provided squared head portion 57 can fit within drive tool adapter 54 and extraction tool adapter 55. Thus the radius of middle portion 60 of base member can be varied to achieve the foregoing.

As will be appreciated, the purpose of the present invention is to be embedded within another object and extract it upon being pulled. Accordingly, it will be apparent that middle portion 60 of base member 53 does not have to have circular cross section. It can have any shape provided the structural integrity is not compromised.

As will be appreciated, the present invention is intended to be used with pre-existing kelly bar assembly 52. Accordingly, as will be obvious, these pre-existing elements can be found in various sizes and squared head portion 57 and extraction coupling 70 can be varied in size to accommodate such variations.

It is preferred that drill bit 58 not be specially made but of the off-the-shelf variety. Accordingly, the sizes of drill bit coupling stem 65 and drill bit socket 61 may be varied as needed. It is preferred that drill bit 58 be sized so as to facilitate the insertion of the threaded portion 56 into a rigid body (e.g. wooden pole). An oversized drill bit will prevent the threads from digging in.

In operation, the user first attaches drill bit 58 to base member 53. Drill bit coupling stem 65 of drill bit 58 is capable of releasable attachment to drill bit socket 61, and is secured by drill bit fasteners 64. Next, kelly bar assembly 52 is attached to squared head portion 57 of base member 53, and secured by inserting adapter fastener 62 through drive tool fastener holes 67 and adapter socket 66.

Kelly Bar Adapter 63 is then connected to the matching Kelly Bar of a drive system. Drill bit 58 of the tool is then positioned centrally in the exposed end of a rigid body that requires removal from the ground or from the water. The drive is engaged to transfer rotational and downward force through base member 53 and drill bit 58 to enable the improved extraction tool to be inserted within the rigid body to a predetermined length. Threaded portion 56 of base member 53 thereby engages and secures the rigid body for removal.

The drive with Kelly Bar is then disengaged from Kelly Bar Adapter 63. Adapter fastener 62 is removed, and kelly bar assembly 52 is detached from squared head portion 57. Next, extraction coupling 70 is attached to squared head portion 57 of base member 53, and secured by inserting adapter fastener 62 through extraction tool fastener holes 68 and adapter socket 66.

A winch device and/or pulling system is then attached to handle 59 of extraction coupling 70. The pulling system transfers vertical force through base member 53 to enable the improved extraction tool to be used to lift the rigid body and remove it from the ground or from the water. The body is removed and laid on the ground with the invention embedded therein.

After the rigid body is moved to its desired location, the user inserts a spanner bar or similar device through handle 59 of extraction coupling 70. The spanner bar is turned so as to reverse the drill bit 58 (e.g. counterclockwise) to remove the extraction tool from the rigid body. It may be necessary to use one or more “can hooks” (known in the art) to hold the body in place as the tool is removed. The spanner bar is used to break it free. Then, a screw driver (or equivalent) is inserted through handle 59 to unscrew the invention the rest of the way.

As will be apparent, base member 53 could be combined with kelly bar assembly 52 or extraction coupling 70 thus forming two separate tools. Such an embodiment is not preferred because the efficiency achieved by the interchangeability of base member 53 with kelly bar assembly 52 and extraction coupling 70 would be lost. However, this embodiment is possible.

As will be apparent, base member 53 could be modified such that drill bit 58 is not separate but part of the base member. Although possible, this embodiment is not preferred.

As will be apparent, the present invention can achieved by assembling various parts or by machining one part to have the necessary shapes using means and/or methods known in the art to achieve the spirit of the invention. The spirit of this invention comprises using a first rigid body (e.g. a base member) to bore within a second rigid body (e.g. a wooden pole) embedded within a confinement (e.g. the ground), the first rigid body is pulled thus pulling the second rigid body from the confinement, and then removing the first rigid body from the second rigid body.

What is claimed is:

1. An extraction tool comprising:

an elongated base member having first and second ends;

and a drill bit being removably attachable to a socket in the first end;

the elongated base member having a cylindrical middle portion being substantially 2.0 inches in diameter, the base member having a first threaded portion being disposed approximate the first end, the first threaded portion being substantially 12.0 inches in length, and having 2½"-4 UNC thread;

the base member having a conical transition bit mounting foot disposed between the first threaded portion and the socket in the first end, the conical transition bit mounting foot being tapered substantially from 2.0 inches in diameter to 1.38 inches in diameter, the second end being adapted to be removably connected to a load bearing coupling.

2. The apparatus of claim 1 further comprising:

the load bearing coupling being a kelly bar adapter.

3. The apparatus of claim 1 further comprising:

the load bearing coupling comprising an extraction ring having a first end adapted to be removably connected to the second end of the base member and a second end having essentially a ring shape.

4. The apparatus of claim 1 further comprising:

the load bearing coupling having a rectangular cross section and a connection aperture through which a pin can be inserted.

* * * * *